United States Patent Office 3,498,966
Patented Mar. 3, 1970

3,498,966
MONOAZO PIGMENTS CONTAINING A
BENZTRIAZOLE RADICAL
Willy Mueller, Riehen, Switzerland, assignor to Ciba
Limited, Basel, Switzerland, a company of Switzerland
No Drawing. Filed Mar. 14, 1967, Ser. No. 624,972
Claims priority, application Switzerland, May 11, 1966,
6,881/66
Int. Cl. C09b 29/22; C08g 51/66; C09d 7/12
U.S. Cl. 260—157          9 Claims

ABSTRACT OF THE DISCLOSURE

Monoazo pigments which are obtained by coupling the diazo compound of an aromatic amine, especially an amino-benzene, with a 2,3-hydroxy naphthoic acid arylide, the arylide radical of which contains a benztriazole radical. The azo pigments are useful for dyeing for example plastics, lacquers and spinning solutions in orange to red tints which are fast to light and migration.

The present invention is based on the observation that new and valuable monoazo pigments of the formula (1)

in which $R_1$ represents the residue of a diazo component free from groups imparting solubility in water, $R_2$ represents a naphthalene residue in which the azo, hydroxyl and carboxylic acid amide groups are in 1,2,3-position and $R_3$ represents a residue of the formula (2)

or (3)

in which $R_4$ represents a benzene or a naphthalene residue which is fused to the triazole residue through two adjacent carbon atoms and $R_5$ represents an aryl residue, may be obtained when (a) a carboxylic acid halide of the formula (4)
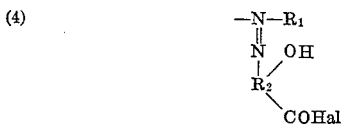

is condensed with an amine of the formula (5)            $H_2N—R_3$ or (b) a diazo compound of an aromatic amine is coupled with a naphthol of the formula (6)

Since the products of the invention are pigments, they must not contain groups imparting solubility in water, particularly acidic groups imparting solubility in water, for example, sulphonic acid or carboxylic acid groups.

Specially valuable products may be obtained when carboxylic acid chlorides of the formula (7)
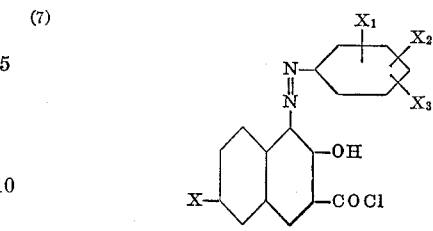

are used as starting materials.

The carboxylic acids from which the halides are derived may be obtained by coupling a diazo compound of an aromatic amine, preferably an aminobenzene, especially one of the formula (8)

in which X represents a hydrogen or a halogen atom or an alkoxy group, $X_1$ represents a hydrogen or a halogen atom and $X_2$ and $X_3$ each represents a hydrogen or halogen atom or an alkyl, alkoxy, phenoxy, nitro, cyano, carbalkoxy, carbamido, aliphatic acylamino or trifluoromethyl group, with a 2,3-hydroxynaphthoic acid, especially one of the formula (9)
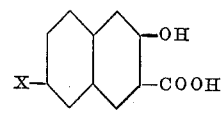

in which X represents a hydrogen or a halogen atom or an alkoxy group.

The following may be mentioned as examples of aminobenzenes of the Formula 5: aniline, and especially halogenated anilines, for example, 2-, 3- or 4-chloroaniline, 3,4 - dichloroaniline, 2,3 - dichloroaniline, 2,4-dichloroaniline, 2,5-dichloroaniline, 2,6-dichloroaniline, 2,4,5-trichloroaniline, 2,4,6-trichloroaniline, 2-, 3- or 4-bromoaniline, 2,4-dibromoaniline, 2,5-dibromoaniline, 2-methyl-5 - chloroaniline, 2 - methyl-4-chloroaniline, 2-methyl-3-chloroaniline, 2-chloro-5-trifluoromethylaniline, furthermore, nitroanilines, for example, 2-, 3- and 4-nitroaniline, 4-chloro-2-nitroaniline, 2-chloro-4-nitroaniline, 4-methyl-3 - nitroaniline, 2,4 - dimethyl-3-nitroaniline, 2-methyl-5-nitroaniline, 2-methyl-4-nitroaniline, furthermore, alkoxyanilines and phenoxyanilines, for example, 2- and 4-methoxyaniline, 2- and 4-ethoxyaniline, 3-chloro-4-methoxyaniline, 2 - methoxy - 5-nitroaniline, 2-methoxy-5-chloroaniline, 2 - methoxy - 5-trifluoromethylaniline, 2-amino-4-trifluoromethyl-4'-chlorodiphenylether, 2 - nitro-4-ethoxyaniline, 2-methoxy-4-chloro-5-methylaniline, 2-amino-4-chlorodiphenylether, 2 - amino-2,4-dichlorodiphenylether, 2-amino-4,4'-dichlorodiphenylether, and also 1-amino-2-carboxylic acid methylester, 1-amino-2-chloro-5-carboxylic acid methylester, 2-amino-5-nitrobenzoic acid methylester, 1-amino-2-methylbenzene-5-carboxylic acid methylester, 1-amino-2-chlorobenzene-5-carboxylic acid methylamide and 2-amino-4-trifluoromethyldiphenylether.

Amines which are of special interest correspond to the formula

(10)
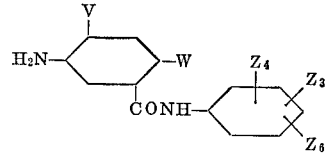

in which V represents a halogen atom or an alkyl, alkoxy or carbalkoxy group, W and $Z_4$ each represents a hydrogen or halogen atom and $Z_5$ and $Z_6$ each represents a hydrogen or halogen atom or an alkyl, alkoxy, nitro, cyano, carbalkoxy or trifluoromethyl group.

The following may be mentioned as examples:

4-methyl-3-aminobenzoic acid-2'-chloro-5'-trifluoromethylanilide,
4-chloro-3-aminobenzoic acid-2',5'-dichloroanilide,
4-chloro-3-aminobenzoic acid-2'-chloro-5'-carbomethoxyanilide,
4-chloro-3-aminobenzoic acid-3'-chloroanilide,
4-chloro-3-aminobenzoic acid-2'-chloro-5'-trifluoromethylanilide,
4-chloro-3-aminobenzoic acid-3'-trifluoromethylanilide,
4-chloro-3-aminobenzoic acid-3',5'-bis-trifluoromethylanilide,
4-chloro-3-aminobenzoic acid-2',4',5'-trichloroanilide,
2,4-dichloro-5-aminobenzoic acid-2',5'-dichloroanilide,
2,4-dichloro-5-aminobenzoic acid-2',4'-dichloroanilide,
2,4-dichloro-5-aminobenzoic acid-3'-trifluoromethylanilide,
2,4-dichloro-5-aminobenzoic acid-3'-chloroanilide,
5-amino-4-methoxy-2-chlorobenzoic acid-3'-trifluoromethylanilide,
4-methyl-3-aminobenzoic acid-2',5'-dichloroanilide,
4-methyl-3-aminobenzoic acid-3'-trifluoromethylanilide,
4-methoxy-3-aminobenzoic acid-3'-chloroanilide,
4-methoxy-3-aminobenzoic acid-2',5'-dichloroanilide,
4-methoxy-3-aminobenzoic acid-2',4',5'-trichloroanilide,
4-carbomethoxy-3-aminobenzoic acid anilide,
4-methoxy-3-aminobenzoic acid-3'-trifluoromethylanilide,
4-carbethoxy-3-aminobenzoic acid-2',5'-dichloroanilide,
4-methoxy-3-aminobenzoic acid-3',5'-bis-trifluoromethylanilide,
4-methoxy-3-aminobenzoic acid-2'-chloro-5'-trifluoromethylanilide,
4-methoxy-3-aminobenzoic acid-2',5'-dimethoxy-4'-chloroanilide,
4-methoxy-3-aminobenzoic acid-2',5'-dimethyl-4'-chloroanilide and
4-methoxy-3-aminobenzoic acid-3'-trifluoromethylanilide.

The azo dyestuff carboxylic acids obtained are treated with agents which are capable of converting carboxylic acids into their acid halides, for example, their acid chlorides or bromides, such agents being, in particular, phosphorus halides, for example, phosphorus pentabromide or phosphorus trichloride or phosphorus pentachloride, phosphorus oxyhalides and preferably thionyl chloride.

The treatment with the said acid halogenating agents is advantageously carried out in an inert organic solvent, for example, in dimethylformamide, a chlorobenzene, for example, monochlorobenzene or dichlorobenzene, toluene, xylene or nitrobenzene, if necessary, dimethylformamide may be used in conjunction with the last five solvents specified.

When preparing the carboxylic acid halides, it is generally advantageous first to dry the azo compounds, which are prepared in an aqueous medium, or to free them from water by azeotropic distillation in an organic solvent. If desired, the azeotropic drying may be carried out immediately before the treatment with the acid halogenating agents.

The azo dyestuff carboxylic acid chlorides so obtained are preferably condensed with monoamines of the formula

(11) 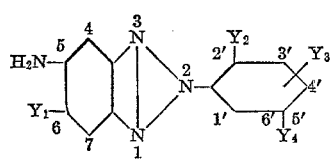

or with monoamines of the formula

(12) 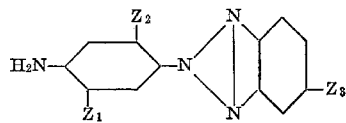

The following may be mentioned as examples:

5-amino-4'-methoxy-2-phenylbenztriazole,
5-amino-4'-ethoxy-2-phenylbenztriazole,
5-amino-4'-carbethoxy-2-phenylbenztriazole,
5-amino-4'-acetylamino-2-phenylbenztriazole,
5-amino-6-chloro-4'-methyl-2-phenylbenztriazole,
5-amino-6,2',4',5-tetrachloro-2-phenylbenztriazole,
5-amino-6-methyl-2-phenylbenztriazole,
5-amino-6-methyl-4'-ethoxy-2-phenylbenztriazole,
5-amino-6-methyl-4'-carbethoxy-2-phenylbenztriazole,
5-amino-6-methyl-2',5'-dimethoxy-4'-chloro-2-phenylbenztriazole,
5-amino-6-methyl-2',5'-dimethoxy-4'-benzoylamino-2-phenylbenztriazole,
5-amino-6-methyl-4'-benzoylamino-2-phenylbenztriazole,
5-amino-6,2'-dimethyl-4'-nitro-2-phenylbenztriazole,
5-amino-6-methyl-2'-methoxy-4'-nitro-2-phenylbenztriazole,
5-amino-6,2'-dimethyl-4'-nitro-2-phenylbenztriazole,
5-amino-6-methyl-2'-nitro-4'-methoxy-2-phenylbenztriazole,
5-amino-6-methyl-3',5'-di(trifluoromethyl)-2-phenylbenztriazole,
5-amino-6-methyl-2'-chloro-5'-trifluoromethyl-2-phenylbenztriazole,
5-amino-6-methoxy-4'-acetylamino-2-phenylbenztriazole,
5-amino-6-methoxy-4'-benzoylamino-2-phenylbenztriazole,
5-amino-6-methoxy-4'-carbomethoxy-2-phenylbenztriazole,
5-amino-6-methoxy-4'-carbethoxy-2-phenylbenztriazole,
5-amino-6-methoxy-5'-aminosulphonyl-2-phenylbenztriazole,
5-amino-6-methoxy-2'-chloro-5'-trifluoromethyl-2-phenylbenztriazole,
5-amino-6-methoxy-2'-trifluoromethyl-4'-chloro-2-phenylbenztriazole,
4'-amino-5'-methyl-2-phenylbenztriazole,
4'-amino-5'-methyl-5-chloro-2-phenylbenztriazole,
4'-amino-5,5'-dimethyl-2-phenylbenztriazole,
4'-amino-5'-methyl-5-methoxy-2-phenylbenztriazole,
4'-amino-2',5'-dimethyl-2-phenylbenztriazole,
4'-amino-2',5'-dimethyl-5-chloro-2-phenylbenztriazole,
4'-amino-2',5,5'-trimethyl-2-phenylbenztriazole,
4'-amino-2',5'-dimethyl-5-methoxy-2-phenylbenztriazole,
4'-amino-2'-methyl-5'-methoxy-2-phenylbenzatriazole,
4'-amino-2'-methyl-5'-methoxy-5-chloro-2-phenylbenztriazole,
4'-amino-2',5-dimethyl-5'-methoxy-2-phenylbenztriazole,
4'amino-2'-methyl-5,5'-dimethoxy-2-phenylbenztriazole,
4'-amino-2',5'-dimethoxy-2-phenylbentriazole,
4'-amino-2',5'-dimethoxy-5-chloro-2-phenylbenztriazole,
4'-amino-2',5'-dimethoxy-5-methyl-2-phenylbenztriazole,
4'-amino-2',5,5'-trimethoxy-2-phenylbenztriazole,
4'-amino-5-chloro-2-phenylbenztriazole,
4'-amino-5-trifluoromethyl-2-phenylbenztriazole,
4'-amino-5'-methyl-5-trifluoromethyl-2-phenylbenztriazole,
4'-amino-2'-chloro-5'-methyl-5-trifluoromethyl-2-phenylbenztriazole,
4'-amino-2',5'-dimethyl-5-trifluoromethyl-2-phenylbenztriazole,
4'-amino-2'-methyl-5'-methoxy-5-trifluoromethyl-2-phenylbenztriazole,
4'-amino-2',5'-dimethoxy-5-trifluoromethyl-2-phenylbenztriazole, 4'-amino-2',5'-diethoxy-5-trifluoromethyl-2-phenylbenztriazole,
4'-amino-2-phenylnaphthotriazole,
4'-amino-2'-methyl-2-phenylnaphthotriazole,
4'-amino-2'-chloro-2-phenylnaphthotriazole,
4'-amino-2'-methoxy-2-phenylnaphthotriazole and
4'-amino-2',5'-dimethyl-2-phenylnaphthotriazole.

Condensation between the carboxylic acid halides and the amines defined above is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine.

Some of the products obtained are crystalline and some are amorphous. They are generally obtained in a very good yield and in a pure state. It is expedient first to isolate the acid chlorides obtained from the carboxylic acids. In some cases, however, isolation of the acid chlorides may be omitted without harm and condensation may be carried out immediately after the preparation of the carboxylic acid chlorides.

In method (b) of the process of the invention, the new pigments may be obtained by coupling a diazotized aromatic amine, preferably an aminobenzene, especially one of the Formula 5 or 10, with a naphthol of the Formula 6, especially one of the formula

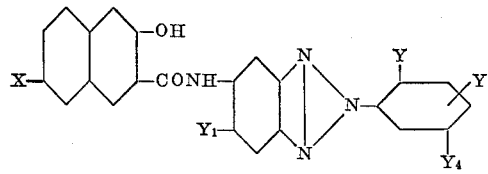

or of the formula

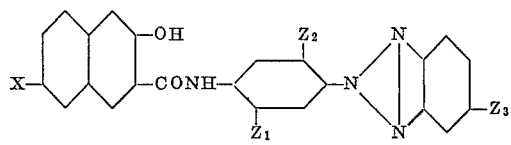

in which formulae the symbols have the meanings given above.

Coupling is effected by gradual addition of an aqueous alkaline solution of the coupling component to an acidic solution of the diazonium salt. The alkali hydroxide used to dissolve the coupling component is advantageously used in an amount such that there is sufficient present to neutralize the mineral acid liberated from the diazonium salt during coupling. Coupling is advantageously carried out at a pH value of 4 to 6. The pH value is advantageously adjusted by the addition of a buffer. Suitable buffers are, for example, the salts, especially the alkali metal salts, of formic acid, phosphoric acid or especially acetic acid. The alkaline solution of the coupling component advantageously contains a wetting, dispersing or emulsifying agent, for example, an aralkylsulphonate, for example, dodecylbenzenesulphonate or the sodium salt of 1,1'-naphthylmethanesulphonic acid, polycondensation products of alkylene oxides, for example, the product obtained by reacting ethylene oxide with para-tert.octylphenol, and also the alkylesters of sulphoricinoleates, for example, n-butylsulphoricinoleate. The dispersion of the coupling component may also advantageously contain protective colloids, for example, methylcellulose or small amounts of inert organic solvents which are sparingly soluble or insoluble in water, for example, aromatic hydrocarbons which may be halogenated or nitrated, for example, benzene, toluene, xylene, chlorobenzene, dichlorobenzenes or nitrobenzenes, as well as aliphatic halogenated hydrocarbons, for example, carbon tetrachloride or trichloroethylene; also suitable are organic solvents miscible with water, for example, acetone, methylethylketone, methanol, ethanol or isopropanol.

Coupling may be carried out advantageously by continuously combining an acidic solution of the diazonium salt with an alkaline solution of the coupling component in a mixing nozzle, during which coupling takes place instantaneously. Care must be taken to ensure that the diazo component and coupling component are present in the mixing nozzle in equimolecular amounts, but it may be advantageous to use a small excess of the coupling component. The simplest way of doing this is by control of the pH value of the liquid in the mixing nozzle. Care must also be taken to ensure that the two solutions are in a state of violent turbulence in the mixing nozzle. The pigment dispersion formed is removed continuously from the mixing nozzle and the pigment is isolated by filtration.

The new products are valuable pigments which may be used for a very wide variety of purposes. For example, they may be used in a state of fine division for the spin-colouration of filament and staple-fibre viscose, cellulose ethers, cellulose esters, polyamides, polyurethanes and polyesters, and also in the production of coloured laquers and lake-formers, solutions or products made from acetylcellulose, nitrocellulose, natural or synthetic resins, for example, polymerization resins or condensation resins, for example aminoplasts, alkyd resins, phenoplasts, polyolefines, for example, polystyrene, polyvinyl chloride, polyethylene, polypropylene, polyacrylonitrile, rubber, casein, silicones and silicone resins. They may also be used advantageously in the manufacture of coloured pencils, cosmetic preparations and laminated sheet material.

The following examples illustrate the invention. Unless otherwise stated, the parts and percentages are by weight.

EXAMPLE 1

168 parts of the dyestuff obtained by diazotising 5-trifluoromethyl-2-chloro-1-aminobenzene in aqueous hydrochloric acid with sodium nitrite and coupling with 2,3-hydroxynaphthoic acid are heated for one hour at 100 to 110° C., while stirring, in admixture with 1,000 parts of ortho-dichlorobenzene, 70 parts of thionyl chloride and 5 parts of dimethylformamide. After cooling the reaction mixture, the monocarboxylic acid chloride of the dyestuff is isolated by filtration, washed with cold benzene and dried in vacuo at 40 to 50° C.

8.3 parts of the acid chloride so obtained are heated for 12 hours at 140 to 145° C. in admixture with 6.2 grams of 6-amino-5-methoxy-2-(4'-acetylaminophenyl)-2,1,3-benztriazole and 400 parts of ortho-dichlorobenzene. The batch is then filtered at 100–120° C. and the pigment which is isolated is washed with ortho-dichlorobenzene at 130° C. until the filtrate runs practically colourless. Subsequently, it is washed with methanol until all the dichlorobenzene has been removed and then with hot water; it is dried in vacuo at 90 to 100° C. The product obtained corresponds to the formula

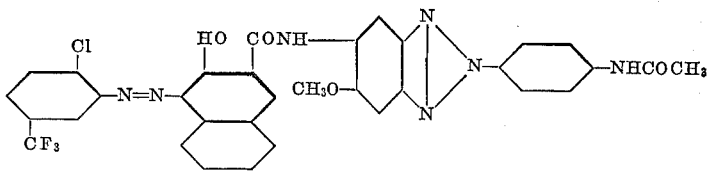

and is a red pigment which is sparingly soluble to insoluble in the common solvents and which colours polyvinyl chloride film and lacquers scarlet tints which are fast to light, migration and over-stripe bleeding.

The monoazo dyestuff carboxylic acids obtained from the diazo components listed in Column I of the following table and the coupling components shown in Column II can be reacted in the manner described in the first and second paragraphs of the above example via the corresponding carboxylic acid chlorides with 1 mol of the aminobenztriazole components listed in Column III. The tints which the pigments produce in polyvinyl chloride film are indicated in Column IV.

| Number | Diazo component | Coupling component | Aminotriazole | Tint in PVC |
|---|---|---|---|---|
| 1 | 2-chloro-5-trifluoro-methylaniline | 2,3-hydroxynaphthoic acid | 5-methyl-6-amino-4'-carbethoxy-2-phenylbenztriazole. | Scarlet. |
| 2 | do | do | 5-methyl-6-amino-4'-nitro-2'-methoxy-2-phenylbenztriazole. | Scarlet-red. |
| 3 | do | do | 5-methyl-6-amino-4'-methyl-2'-nitro-2-phenylbenztriazole. | Scarlet. |
| 4 | do | do | 5-methoxy-6-amino-4'-methoxy-2-phenylbenztriazole. | Yellowish scarlet. |
| 5 | 2,4,5-trichloroaniline | do | 5-methoxy-6-amino-4'-acetylamino-2-phenylbenztriazole. | Red. |
| 6 | do | do | 5-methyl-6-amino-4'-carbethoxy-2-phenylbenztriazole. | Brown-red. |
| 7 | do | do | 5-methyl-6-amino-2'-nitro-4'-methyl-2-phenylbenztriazole. | Bluish red. |
| 8 | do | do | 5-methoxy-6-amino-4'-methoxy-2-phenylbenztriazole. | Scarlet red. |
| 9 | 2,5-dichloroaniline | do | do | Orange. |
| 10 | do | do | 5-methoxy-6-amino-4'-carbethoxy-2-phenylbenztriazole. | Red. |
| 11 | do | do | 6-amino-4'-carbethoxy-2-phenylbenztriazole. | Do. |
| 12 | do | do | 5-methyl-6-amino-4'-carbethoxy-2-phenylbenztriazole. | Yellowish red. |
| 13 | do | do | 5-chloro-6-amino-4'-carbethoxy-2-phenylbenztriazole. | Orange. |
| 14 | 4-nitro-2-trifluoro-methylaniline | do | 5-methoxy-6-amino-4'-carbethoxy-2-phenylbenztriazole. | Bluish red. |
| 15 | 2-nitro-4-trifluoromethylaniline | do | do | Red. |
| 16 | do | do | 5-methyl-6-amino-4'-carbethoxy-2-phenylbenztriazole. | Scarlet. |
| 17 | do | do | 6-amino-4'-carbethoxy-2-phenylbenztriazole. | Orange. |
| 18 | do | do | 5-chloro-6-amino-4'-carbethoxy-2-phenylbenztriazole. | Yellowish orange. |
| 19 | do | do | 6-amino-4'-carbamido-2-phenylbenztriazole. | Orange. |
| 20 | 2-amino-4-trifluoromethyldiphenyl ether. | do | 5-chloro-6-amino-4'-acetylamino-2-phenylbenztriazole. | Scarlet. |
| 21 | do | do | 5-methyl-6-amino-4'-methoxy-2-phenylbenztriazole. | Scarlet red. |
| 22 | 2-aminobenzoic acid methylester | do | 5-methoxy-6-amino-4'-benzoylamino-2-phenylbenztriazole. | Red. |
| 23 | do | do | 5-methoxy-6-amino-4'-carbethoxy-2-phenylbenztriazole. | Do. |
| 24 | 5-chloro-2-aminobenzoic acid ethyl ester. | do | do | Red-brown. |
| 25 | 2,5-dichloroaniline | 6-bromo-2,3-hydroxynaphthoic acid | do | Blue-red. |
| 26 | do | 6-methoxy-2,3-hydroxynaphthoic acid. | do | Brown. |
| 27 | 4-methyl-3-aminobenzoic acid-2'-chloro-5'-trifluoromethylanilide. | 2,3-hydroxynaphthoic acid | 6-amino-4'-ethoxy-2-phenylbenztriazole. | Scarlet red. |
| 28 | do | do | 5-methyl-6-amino-4'-acetylamino-2-phenylbenztriazole. | Red. |
| 29 | do | do | 5-methyl-6-amino-2',5'-dimethoxy-4'-chloro-2-phenylbenztriazole. | Bluish red. |
| 30 | do | do | 5-methyl-6-amino-4'-ethoxy-2-phenylbenztriazole. | Do. |
| 31 | do | do | 6-amino-4'-methoxy-2-phenylbenztriazole. | Scarlet Red. |
| 32 | 4-methyl-3-aminobenzoic acid-2',5'-dichloroanilide. | do | do | Scarlet. |
| 33 | do | do | 5-methyl-6-amino-4'-ethoxy-2-phenylbenztriazole. | Red. |
| 34 | do | do | 5-methyl-6-amino-2',5'-dimethoxy-4'-chloro-2-phenylbenztriazole. | Bluish red. |
| 35 | do | do | 6-amino-4'-carbethoxy-2-phenylbenztriazole. | Brown-orange. |
| 36 | do | do | 5-chloro-6-amino-4'-carbethoxy-2-phenylbenztriazole. | Red. |
| 37 | do | do | 5-methoxy-6-amino-4'-carbethoxy-2-phenylbenztriazole. | Do. |
| 38 | do | do | 5-methyl-6-amino-4'-carbethoxy-2-phenylbenztriazole. | Do. |
| 39 | do | do | 5-methyl-6-amino-2'-methoxy-4'-nitro-2-phenylbenztriazole. | Orange. |
| 40 | do | do | 5-methyl-6-amino-4'-benzoylamino-2-phenylbenztriazole. | Bluish red. |
| 41 | do | do | 5-methoxy-6-amino-3'-aminosulphonyl-2-phenylbenztriazole. | Scarlet. |
| 42 | 4-methyl-3-aminobenzoic acid-2',4',5'-trichloroanilide. | do | 5-chloro-6-amino-2',4',5'-trichloro-2-phenylbenztriazole. | Bluish red. |
| 43 | do | do | 5-methoxy-6-amino-4'-acetylamino-2-phenylbenztriazole. | Red. |
| 44 | do | do | 5-methyl-6-amino-3',5'-di(trifluoromethyl)-2-phenylbenztriazole. | Bluish red. |
| 45 | do | do | 5-methoxy-6-amino-4'-carbethoxy-2-phenylbenztriazole. | Red. |
| 46 | do | do | 6-amino-4'-carbethoxy-2-phenylbenztriazole. | Do. |
| 47 | do | do | 5-chloro-6-amino-4'-carbethoxy-2-phenylbenztriazole. | Do. |
| 48 | do | do | 5-methyl-6-amino-4'-carbethoxy-2-phenylbenztriazole. | Do. |
| 49 | do | do | 5-methyl-6-amino-4'-benzoylamino-2-phenylbenztriazole. | Bluish red. |
| 50 | do | do | 5-methoxy-6-amino-3'-aminosulphonyl-2-phenylbenztriazole. | Scarlet. |
| 51 | do | do | 5-methyl-6-amino-2'-methoxy-4'-nitro-2-phenylbenztriazole. | Bluish red. |

| Number | Diazo component | Coupling component | Aminotriazole | Tint in PVC |
| --- | --- | --- | --- | --- |
| 52 | 4-chloro-3-aminobenzoic acid-3'-chloro-2'-methylanilide. | do | 5-methyl-6-amino-2',5'-dimethoxy-4'-benzoylamino-2-phenylbenztriazole. | Scarlet. |
| 53 | do | do | 5-methyl-6-amino-2',5'-dimethoxy-4'-chloro-2-phenylbenztriazole. | Do. |
| 54 | do | do | 5-methyl-6-amino-4'-ethoxy-2-phenylbenztriazole. | Do. |
| 55 | do | do | 5-methyl-6-amino-4'-acetylamino-2-phenylbenztriazole. | Orange. |
| 56 | do | do | 5-chloro-6-amino-2',4',5'-trichloro-2-phenylbenztriazole. | Do. |
| 57 | do | do | 5-methyl-6-amino-4'-benzoylamino-2-phenylbenztriazole. | Scarlet. |
| 58 | do | do | 5-methyl-6-amino-2'-methoxy-4'-nitro-2-phenylbenztriazole. | Red. |
| 59 | do | do | 5-methyl-6-amino-2'-nitro-4'-methyl-2-phenylbenztriazole. | Do. |
| 60 | do | do | 5-methoxy-6-amino-4'-carbethoxy-2-phenylbenztriazole. | Orange. |
| 61 | do | do | 5-methyl-6-amino-3'-trifluoromethyl-2-phenylbenztriazole. | Scarlet. |
| 62 | do | do | 6-amino-4'-carbethoxy-2-phenylbenztriazole. | Do. |
| 63 | do | do | 5-chloro-6-amino-4'-carbethoxy-2-phenylbenztriazole. | Do. |
| 64 | do | do | 6-amino-4'-carbamido-2-phenylbenztriazole. | Red. |
| 65 | do | do | 5-methyl-6-amino-4'-carbethoxy-2-phenylbenztriazole. | Scarlet. |
| 66 | do | do | 2',5'-dimethoxy-4'-amino-2-phenylbenztriazole. | Brown. |
| 67 | 4-methoxy-3-aminobenzoic acid-3'-trifluoromethylanilide. | do | 5-methoxy-6-amino-4'-methoxy-2-phenylbenztriazole. | Carmine. |
| 68 | do | do | 6-amino-4'-ethoxy-2-phenylbenztriazole. | Do. |
| 69 | do | do | 5-methyl-6-amino-4'-acetylamino-2-phenylbenztriazole. | Blue-red. |
| 70 | do | do | 5-methyl-6-amino-2',5'-dimethoxy-4'-chloro-2-phenylbenztriazole. | Do. |
| 71 | do | do | 5-methyl-6-amino-4'-ethoxy-2-phenylbenztriazole. | Carmine. |
| 72 | do | do | 6-amino-4'-methoxy-2-phenylbenztriazole. | Do. |
| 73 | do | do | 5-chloro-6-amino-4'-carbethoxy-2-phenylbenztriazole. | Blue-red. |
| 74 | do | do | 5-methyl-6-amino-3',5'-di(trifluoromethyl)-2-phenylbenztriazole. | Do. |
| 75 | do | do | 5-methoxy-6-amino-4'-carbethoxy-2-phenylbenztriazole. | Carmine. |
| 76 | do | do | 5-methoxy-6-amino-4'-acetylamino-2-phenylbenztriazole. | Do. |
| 77 | do | do | 5-methyl-6-amino-4'-carbethoxy-2-phenylbenztriazole. | Do. |
| 78 | do | do | 5-methyl-6-amino-2'-methoxy-4'-nitro-2-phenylbenztriazole. | Bluish red. |
| 79 | 2,5-dimethoxy-4-benzoylaminoaniline | do | 5-methyl-6-amino-4'-carbethoxy-2-phenylbenztriazole. | Navy blue. |
| 80 | 2,5-diethoxy-4-benzoylaminoaniline | do | 5-methoxy-6-amino-4'-acetylamino-2-phenylbenztriazole. | Blue. |
| 81 | 4-methyl-3-aminobenzoic acid-2',4',5'-trichloroanilide. | do | 2-(4'-aminophenyl)-naphthotriazole. | Do. |
| 82 | 2-chloro-5-trifluoromethylaniline | do | 5-benzoylamino-2-(4'-aminophenyl)-benztriazole. | Do. |

EXAMPLE 2

8.1 parts of 2,5-dichloro-1-aminobenzene are diazotized in the usual manner with aqueous hydrochloric acid, ice and sodium nitrite.

Meanwhile, 24.5 parts of 5-methyl-6-(2'-hydroxy-3'-naphthoylamino)-2''-chlorobenztriazole - 5'' - carboxylic acid methylester are dissolved in 50 parts of ethanol, 10 parts of 30% sodium hydroxide solution, 200 parts of water and 100 parts of ethyleneglycolmonomethylether. 1 part of the condensation product obtained from 8 mols of ethylene oxide and 1 mol of paratert.octylphenol is added to the solution and subsequently the naphthol is precipitated with 70 parts of glacial acetic acid while stirring well. Coupling is effected by addition of the diazo compound described in the first paragraph while keeping the pH value at 3 to 4 and the temperature at 35 to 40° C. The batch is stirred for about 2 hours at the same temperature to complete the coupling, the pigment suspension formed is rendered acid to Congo paper by the addition of hydrochloric acid and then filtered. The filter residue is washed with hot water until chlorine ions can no longer be detected in the filtrate.

The moist filter cake is stirred into 250 parts of chlorobenzene, the mixture is heated in a closed vessel while stirring, and the water is distilled in admixture with chlorobenzene by means of a descending condenser. When the internal temperature has reached 132° C., the batch is cooled to 100° C., filtered, and the filter residue is washed first with hot chlorobenzene until the filtrate runs practically colourless and then with cold methyl alcohol. Finally, it is washed with hot water and then dried in vacuo at 80 to 90° C. A red pigment having a very soft grain and possessing great tinctorial strength is thus obtained in good yield. The tint it produces in plasticized polyvinyl chloride displays a very good fastness to light, solvents and bleeding.

EXAMPLE 3

31.0 parts of 3-amino-4-methoxybenzoic acid - 3' - trifluoromethylanilide are diazotized in the usual manner at 0 to 2° C. and the solution is clarified by filtration.

Meanwhile, 45.5 parts of 5-methoxy-6-(2''-hydroxy-3''-naphthoylamino)-4'-ethoxybenztriazole are dissolved cold in a mixture of 150 parts of ethyleneglycolmonoethylether and 100 parts of 30% sodium hydroxide solution. The two solutions are conducted continuously to a mixing nozzle, if necessary after dilution with water, where coupling of the components takes place instantaneously. The pH value in the mixing nozzle is kept at between 5 and 6 by regulating the flow of the solutions. The temperature must be between 35 and 40° C. The pigment suspension formed is filtered and the filter residue is washed with hot water. It is then stirred for some time with a mixture comprising 20 parts of water, 110 parts of ethyleneglycolmonoethylether and 100 parts of ortho-dichlorobenzene, at a temperature of 80 to 90° C., and the batch is then filtered. The filter residue is washed successively with ethyleneglycolmonoethylether and ethanol and then dried in vacuo at 70 to 80° C. A red pigment of high tinctorial strength is obtained in a good yield. It colours polyvinyl chloride bluish red tints which are fast to migration and light.

EXAMPLE 4

A mixture is prepared from 65 parts of stabilized polyvinyl chloride, 35 parts of dioctyl phthalate and 0.2 part of the pigment obtained in the manner described in the first paragraph of Example 1. The mixture is then worked to and fro for 7 minutes at 140° C. on a two-roller mill. A scarlet film possessing a very good fastness to light and migration is obtained.

I claim:
1. An azo pigment of the formula

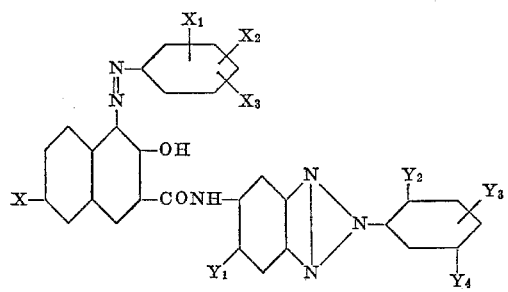

in which X represents a hydrogen or a bromine atom or lower alkoxy group, $X_1$ represents a hydrogen, chlorine or bromine atom, $X_2$ represents a hydrogen or bromine atom or lower alkyl, lower alkoxy, phenoxy, nitro, cyano, lower carbalkoxy, carbamido, lower alkanoylamino or trifluoromethyl group; $X_3$ represents a hydrogen or bromine atom or lower alkyl, lower alkoxy, phenoxy, nitro, cyano, lower carbalkoxy, carbamido, lower alkanoylamino or trifluoromethyl group or

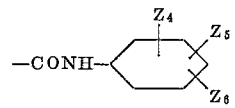

wherein $Z_4$ represents a hydrogen or chlorine or bromine atom and $Z_5$ and $Z_6$ each represents a hydrogen or chlorine or bromine atom or a lower alkyl, lower alkoxy, nitro, cyano, lower carbalkoxy or trifluoromethyl group, $Y_1$ represents a hydrogen or a chlorine or bromine atom or a lower alkyl or lower alkoxy group and $Y_2$, $Y_3$ and $Y_4$ each represents a hydrogen, chlorine or bromine atom or a lower alkyl, lower alkoxy, trifluoromethyl, lower carbalkoxy, cyano, benzoylamino or lower alkanoylamino group.

2. An azo pigment of the formula

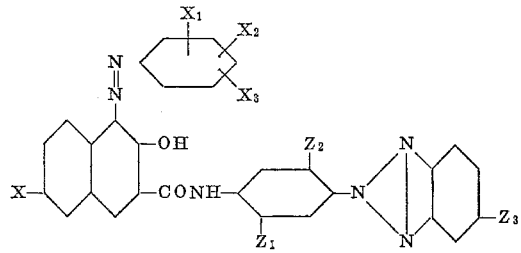

in which $X_1$ represents a hydrogen, chlorine or bromine atom, $X_2$ and $X_3$ each represents a hydrogen or bromine atom or lower alkyl, lower alkoxy, phenoxy, nitro, cyano, lower carbalkoxy, carbamido, lower alkanoylamino or trifluoromethyl group, $Z_1$ and $Z_2$ each represents a hydrogen, chlorine or bromine atom or a lower alkyl or lower alkoxy group and $Z_3$ represents a hydrogen, chlorine or bromine atom or a lower alkyl, lower alkoxy benzoylamino or trifluoromethyl group.

3. An azo pigment of the formula

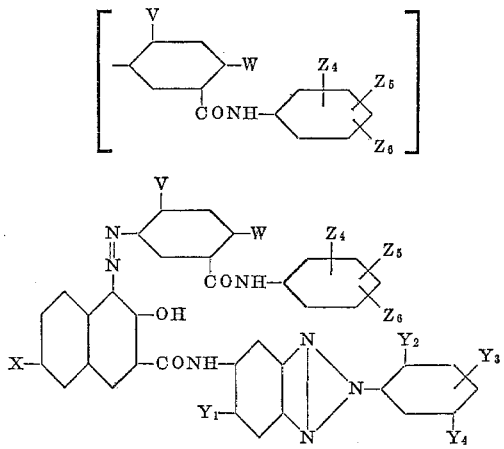

in which V represents a chlorine or bromine atom or a lower alkyl, lower alkoxy or lower carbalkoxy group, W and $Z_4$ each represents a hydrogen or chlorine or bromine atom and $Z_5$ and $Z_6$ each represents a hydrogen or chlorine or bromine atom or a lower alkyl, lower alkoxy, nitro, cyano, lower carbalkoxy or trifluoromethyl group, X represents a hydrogen or a bromine atom or lower alkoxy group, $Y_1$ represents a hydrogen or a chlorine or bromine atom or a lower alkyl or lower alkoxy group and $Y_2$, $Y_3$ and $Y_4$ each represents a hydrogen, chlorine or bromine atom or a lower alkyl, lower alkoxy, trifluoromethyl, lower carbalkoxy, cyano or lower alkanoylamino group.

4. The azo pigment of the formula

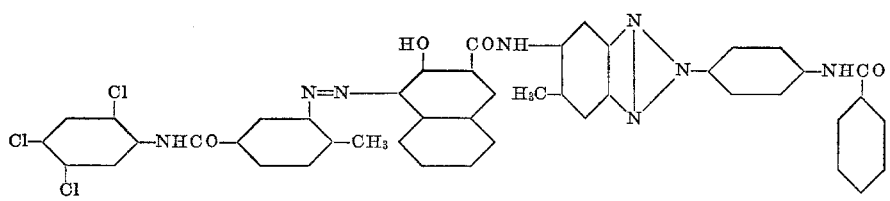

5. The azo pigment of the formula

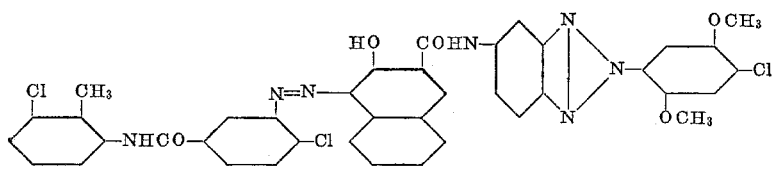

6. The azo pigment as claimed in claim 3 of the formula
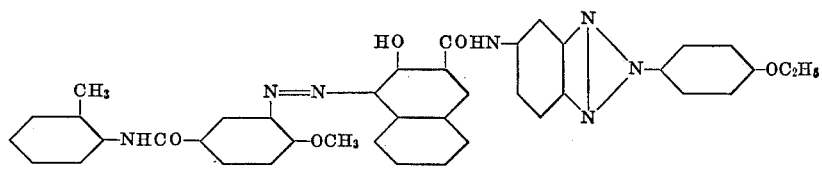
7. The azo pigment as claimed in claim 3 of the formula
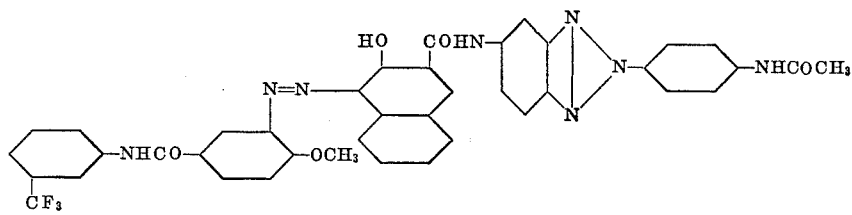
8. The azo pigment of the formula
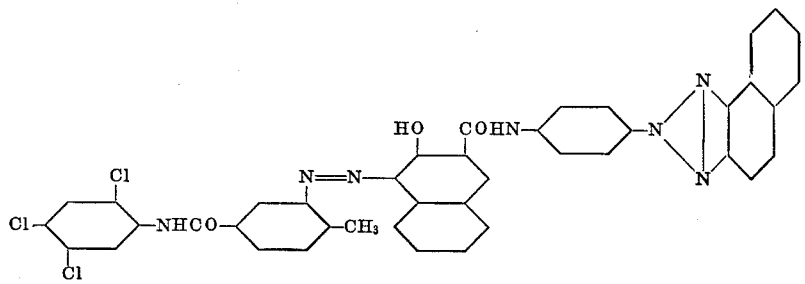
9. The azo pigment of the formula
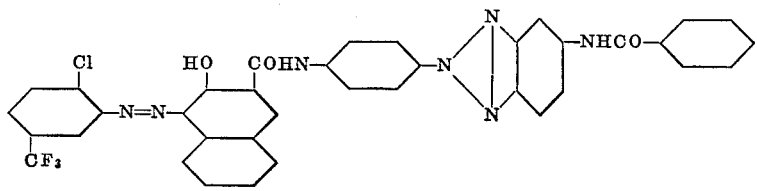
References Cited
UNITED STATES PATENTS
3,121,073  2/1964  Hertel et al. _____ 260—146
CHARLES B. PARKER, Primary Examiner
DONALD M. PAPUGA, Assistant Examiner
U.S. Cl. X.R.
8—4, 5, 41, 55; 106—19; 117—121; 260—37, 202, 308; 424—63, 64

Case 5919/E   D

PO-1050
(5/69)

UNITED STATES PATENT OFFICE
CERTIFICATE OF CORRECTION

Patent No. 3,498,966                    Dated   March 3, 1970

Inventor(s)  WILLY MUELLER

It is certified that error appears in the above-identified patent and that said Letters Patent are hereby corrected as shown below:

Column 10, lines 41 and 43, "Do" should read -- Red --

Signed and sealed this 3rd day of August 1971.

(SEAL)
Attest:

EDWARD M. FLETCHER, JR.            WILLIAM E. SCHUYLER, JR.
Attesting Officer                  Commissioner of Patents